United States Patent
Langer

[11] Patent Number: 5,869,010
[45] Date of Patent: *Feb. 9, 1999

[54] INTUMESCENT SHEET MATERIAL

[75] Inventor: Roger L. Langer, Hudson, Wis.

[73] Assignee: Minnesota Mining and Manufacturing Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 815,321

[22] Filed: Mar. 10, 1997

Related U.S. Application Data

[63] Continuation of Ser. No. 497,066, Jun. 30, 1995, abandoned.

[51] Int. Cl.$^6$ .............................. B01D 53/34; F01N 3/28; B32B 5/16
[52] U.S. Cl. ......................... 422/179; 422/180; 422/221; 428/233; 428/312.2; 428/324; 428/920; 29/515; 423/328.1
[58] Field of Search .................................. 422/179, 180, 422/221, 222, 171, 177; 501/95, 127; 428/241, 245, 324, 233, 312.2, 319.1, 920; 55/523, 524; 423/328.1; 29/890, 515

[56] References Cited

U.S. PATENT DOCUMENTS

| | | | |
|---|---|---|---|
| Re. 27,747 | 9/1973 | Johnson | 165/166 |
| 3,001,571 | 9/1961 | Hatch | 154/2.6 |
| 3,441,381 | 4/1969 | Keith et al. | 23/288 |
| 3,709,706 | 1/1973 | Sowman | 106/57 |
| 3,795,524 | 3/1974 | Sowman | 106/65 |
| 3,916,057 | 10/1975 | Hatch et al. | 428/236 |
| 4,047,965 | 9/1977 | Karst et al. | 106/65 |
| 4,048,363 | 9/1977 | Langer et al. | 428/77 |
| 4,064,359 | 12/1977 | Peterson et al. | 174/107 |
| 4,087,039 | 5/1978 | Balluff | 228/173 R |

(List continued on next page.)

FOREIGN PATENT DOCUMENTS

| | | | |
|---|---|---|---|
| 0 319 299 | 6/1989 | European Pat. Off. . | |
| 639 700 A1 | 2/1995 | European Pat. Off. | F01N 3/28 |
| 639 701 A1 | 2/1995 | European Pat. Off. | F01N 3/28 |
| 639 702 A1 | 2/1995 | European Pat. Off. | F01N 3/28 |
| 2 450 796 | 10/1980 | France . | |
| 2634479 | 1/1990 | France . | |
| 3514150 | 4/1985 | Germany | B01D 53/36 |
| 4194463 | of 0000 | Japan . | |
| 5164472 | 6/1993 | Japan . | |
| 5-245324 | 9/1993 | Japan . | |
| 1 513 808 | 6/1978 | United Kingdom | D21H 5/18 |
| 1 522 646 | 8/1978 | United Kingdom | C04B 31/26 |
| 1 604 908 | 12/1981 | United Kingdom | D21H 5/18 |
| 2164580 | 3/1986 | United Kingdom . | |

OTHER PUBLICATIONS

Stroom et al., "Systems Approach to Packaging Design for Automotive Catalytic Converters", Paper No. 900500, SAE Technical Paper Series, 1990.

Howitt, "Thin Wall Ceramics as Monolithic Catalyst Supports", Paper No. 800082, SAE Technical Paper Series, 1980.

Howitt et al., "Flow Effects in Monolithic Honeycomb Automotive Catalytic Converters", Paper No. 740244, SAE Technical Paper Series, 1974.

Howitt et al., "Cellular Ceramic Diesel Particulate Filter", Paper No. 810114, SAE Technical Paper Series, 1981.

*Primary Examiner*—Hien Tran
*Attorney, Agent, or Firm*—Harold C. Knecht, III

[57] ABSTRACT

The invention provides an intumescent sheet material comprising 20 to 80 dry weight percent of at least one unexpanded intumescent material, 10 to 40 dry weight percent of at least one processed vermiculite selected from ground expanded vermiculite and delaminated vermiculite, greater than 0 to 5 dry weight percent of inorganic fibers having diameters greater than 5 microns, and greater than 0 to 10 dry weight percent of organic fibers; wherein said sheet material comprises substantially no ceramic fibers of less than 5 microns.

20 Claims, 1 Drawing Sheet

U.S. PATENT DOCUMENTS

| | | | |
|---|---|---|---|
| 4,156,533 | 5/1979 | Close et al. | 277/229 |
| 4,269,807 | 5/1981 | Bailey et al. | 422/179 |
| 4,305,992 | 12/1981 | Langer et al. | 428/324 |
| 4,331,621 | 5/1982 | Brockmeyer | 264/44 |
| 4,385,135 | 5/1983 | Langer et al. | 523/179 |
| 4,446,040 | 5/1984 | Samanta | 252/62 |
| 4,495,030 | 1/1985 | Giglia | 162/145 |
| 4,521,333 | 6/1985 | Graham et al. | 252/606 |
| 4,565,727 | 1/1986 | Giglia et al. | 428/172 |
| 4,617,176 | 10/1986 | Merry | 422/179 |
| 4,698,213 | 10/1987 | Shimozi et al. | 422/179 |
| 4,863,700 | 9/1989 | Ten Eyck | 422/179 |
| 4,865,818 | 9/1989 | Merry et al. | 422/179 |
| 4,866,107 | 9/1989 | Doxsee et al. | 523/153 |
| 4,904,343 | 2/1990 | Giglia et al. | 162/145 |
| 4,929,429 | 5/1990 | Merry | 422/179 |
| 4,929,502 | 5/1990 | Giglia | 428/357 |
| 4,951,954 | 8/1990 | MacNeill | 277/230 |
| 4,999,168 | 3/1991 | Ten Eyck | 422/179 |
| 5,008,086 | 4/1991 | Merry | 422/180 |
| 5,045,385 | 9/1991 | Luckanuck | 428/220 |
| 5,126,013 | 6/1992 | Wiker et al. | 162/156 |
| 5,137,656 | 8/1992 | Conner | 252/378 R |
| 5,139,615 | 8/1992 | Conner et al. | 162/145 |
| 5,151,253 | 9/1992 | Merry et al. | 422/179 |
| 5,174,969 | 12/1992 | Fischer et al. | 422/180 |
| 5,207,989 | 5/1993 | MacNeil | 422/179 |
| 5,242,871 | 9/1993 | Hashimoto et al. | 501/95 |
| 5,250,269 | 10/1993 | Langer | 422/179 |
| 5,254,410 | 10/1993 | Langer et al. | 428/402 |
| 5,290,522 | 3/1994 | Rogers et al. | 422/179 |
| 5,326,500 | 7/1994 | Friedman et al. | 423/328.1 |
| 5,332,609 | 7/1994 | Corn | 428/77 |
| 5,340,558 | 8/1994 | Friedman et al. | 423/328.1 |
| 5,384,188 | 1/1995 | Lebold et al. | 428/283 |
| 5,385,873 | 1/1995 | MacNeill | 501/95 |

INTUMESCENT SHEET MATERIAL

This is a continuation of application Ser. No. 08/497,066, filed Jun. 30, 1995, now abandoned.

FIELD OF THE INVENTION

This invention relates to mounting materials for catalytic converters and diesel particulate filters.

BACKGROUND OF THE INVENTION

Pollution control devices are employed on motor vehicles to control atmospheric pollution. Two types of devices are currently in widespread use—catalytic converters and diesel particulate filters or traps. Catalytic converters contain a catalyst, which is typically coated onto a monolithic structure mounted in the converter. The monolithic structures are typically ceramic, although metal monoliths have been used. The catalyst oxidizes carbon monoxide and hydrocarbons, and reduces the oxides of nitrogen in automobile exhaust gases to control atmospheric pollution. Diesel particulate filters or traps are wall flow filters which have honeycombed monolithic structures typically made from porous crystalline ceramic materials.

In the state of the art construction of these devices, each type of the these devices has a metal housing which holds within it a monolithic structure or element that can be metal or ceramic, and is most commonly ceramic. The ceramic monolith generally has very thin walls to provide a large amount of surface area so it is fragile and susceptible to breakage. It also has a coefficient of thermal expansion generally an order of magnitude less than the metal (usually stainless steel) housing in which it is contained. In order to avoid damage to the ceramic monolith from road shock and vibration, to compensate for the thermal expansion difference, and to prevent exhaust gases from passing between the monolith and the metal housing, ceramic mat or paste materials are typically disposed between the ceramic monolith and the metal housing. The process of placing or inserting the mounting material is also referred to as canning and includes such processes as injecting a paste into a gap between the monolith and the metal housing, or wrapping a sheet or mat material around the monolith and inserting the wrapped monolith into the housing.

Typically, the mounting materials include inorganic binders, inorganic fibers that may also serve as a binder, intumescent materials, and, optionally, organic binders, fillers, and other adjuvants. The materials are used as pastes, sheets, and mats. Ceramic mat materials, ceramic pastes, and intumescent sheet materials useful for mounting the monolith in the housing are described in, for example, U.S. Pat. Nos. 3,916,057 (Hatch et al.), 4,305,992 (Langer et al.), 4,385,135 (Langer et al.), 5,254,410 (Langer et al.), and 5,242,871 (Hashimoto et al.).

The use of synthetic mica and asbestos fibers as inorganic binders for inorganic fibrous mounting sheets is described in U.S. Pat. No. 3,001,571 (Hatch).

Paste compositions using micaceous materials are described in G.B. 1,522,646 (Wood).

U.S. Pat. Nos. 5,385,873 (MacNeil) and 5,207,989 (MacNeil) describe inorganic fibrous sheets bound by high aspect ratio vermiculite in paste for mounting monoliths in catalytic converters.

U.S. Patent No. 5,126,013 (Wiker et al.) describes the use of flocculating agents with chemically delaminated mica and/or vermiculite and fibers to make fire resistant papers which are generally thin in comparison to mats and sheets. The dual sequential flocculating system described helps to achieve rapid dewatering in making wet-laid materials and provide better sheet formation without clumping of the fibers.

U.S. Pat. No. 5,137,656 (Connor) describes the use of vermiculite lamellae having an internal sizing agent to make water resistant mineral products. Various means of producing the vermiculite lamellae are described.

One of the shortcomings of the state of the art pastes and mats used for mounting occurs because the exposed edges of the mounting materials are subject to erosion from the pulsating hot exhaust gases. Under severe conditions, over a period of time, the mounting materials can erode and portions of the materials can be blown out. In time, a sufficient amount of the mounting materials can be blown out and the mounting materials can fail to provide the needed protection to the monolith.

Solutions to the problem include the use of a stainless steel wire screen (see e.g., U.S. Pat. No. 5,008,086 (Merry)) and braided or rope-like ceramic (i.e., glass, crystalline ceramic, or glass-ceramic) fiber braiding or metal wire material (see, e.g., U.S. Pat. No. 4,156,533 (Close et al.)), and edge protectants formed from compositions having glass particles (see, e.g., EP 639701 A1 (Howorth et al.), EP 639702 A1 (Howorth et al.), and EP 639700 A1 (Stroom et al.)) to protect the edge of the intumescent mat from erosion by exhaust gases. These solutions employ the use of state of the art mounting materials as the primary support for the monolith.

The materials currently available as mounting mats and sheets typically contain inorganic binder material, refractory ceramic fibers in the range of about less than 5 micrometers in diameter, and other adjuvants. The inorganic binder materials and the refractory ceramic fibers provide the strength and resiliency needed for handling prior to canning as well as to keep the mounting material intact during the repeated heating and cooling cycles experienced in a catalytic converter. The fibers also bind the particulate materials to facilitate drainage of the compositions in making mounting mats in the state of the art wet-laid or papermaking process. The use of refractory ceramic fibers is undesirable and there remains an ongoing need for mounting materials, particularly for mats, having high performance without the use of small diameter, i.e., less than 5 micrometers, refractory ceramic fibers. Additionally, it is desirable for compositions used for mat mounting materials to have good drainage in the process of making the mats as well as resiliency for handling of the mats before mounting and in use in a catalytic converter.

SUMMARY OF THE INVENTION

The invention provides an intumescent sheet material comprising 20 to 80 dry weight percent of at least one unexpanded intumescent material, 10 to 40 dry weight percent of at least one processed vermiculite selected from ground expanded vermiculite and delaminated vermiculite, greater than 0 to 5 dry weight percent of inorganic fibers having diameters greater than 5 microns, and greater than 0 to 10 dry weight percent of organic fibers; wherein said sheet material comprises substantially no ceramic fibers of less than 5 microns. The invention also provides a catalytic converter and a diesel particulate filter containing the intumescent sheet material.

Additional features and advantages of the invention will be set forth in the description which follows, and in part will be apparent from the description, or may be learned by practice of the invention. The objectives and other advantages of the invention will be realized and attained by the methods and articles particularly pointed out in the written description and claims hereof.

It is to be understood that both the foregoing general description and the following detailed description are exemplary and explanatory and are intended to provide further explanation of the invention as claimed.

DETAILED DESCRIPTION OF THE INVENTION

Figure 1:
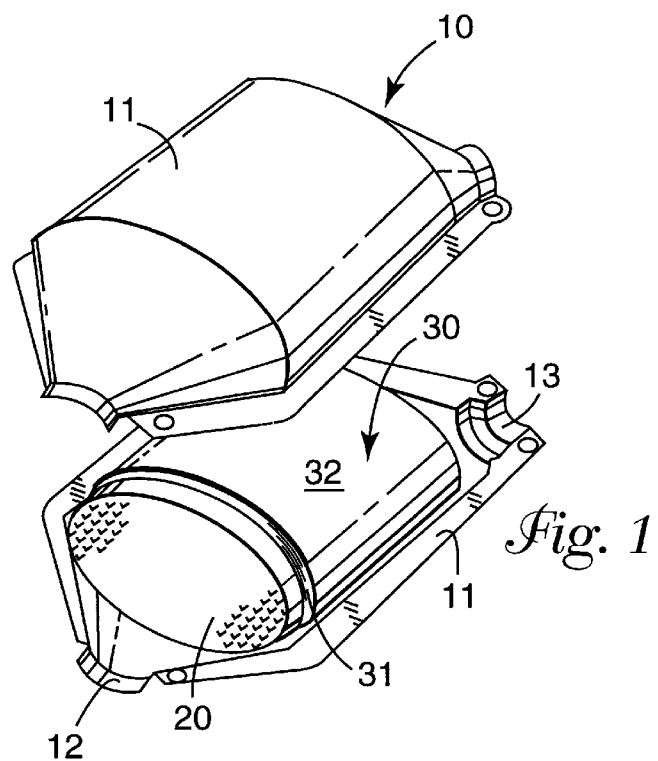
FIG. 1 is a perspective view of a catalytic converter incorporating a preferred embodiment of the present invention and shown in disassembled relation.

The present invention provides a mounting material that has improved erosion resistance over the state of the art materials used for mounting fragile monolithic structures for use in demanding high temperature environments, such as would be encountered in catalytic converters and diesel particulate traps. The mounting materials can be provided in various forms including mats, sheets, and pastes. Preferably the mounting materials are mats which are preferably greater than 1 millimeter (mm) in thickness, and more preferably, greater than 1.5 mm in thickness.

The mounting materials of the invention comprise from about 10 to 40% by weight of a micaceous binder material, 20% to 80% by weight of an intumescent material, and from about 0% to 5% by weight of glass fibers having a diameter less than about 2.0 micrometers. Optionally, the mounting materials can include 0 to 5% inorganic fibers having a diameter between about greater than 5 micrometers, and 0 to 10% organic or polymeric fibers which can be staple fibers, fibrillated fibers, bicomponent binder fibers or a mixture thereof, and 0–5% resinous organic binder.

The amounts of the materials for the compositions can be varied within the scope of the invention to achieve the desired end properties of the mounting materials before and after mounting in a catalytic converter. Paste compositions require adequate rheological properties so that the compositions can be pumped into the gap between the monolith and the metal housing during the mounting or canning operation, and resiliency to hold the composition together at the temperatures of use. Sheets and mats require resiliency as well as strength, flexibility, and conformability prior to mounting since the sheets or mats are formed first, and then wrapped around the monolith. The sheets and mats need sufficient internal strength to hold together as they typically undergo further processing prior to mounting, such as die-cutting, shipping, etc. Additionally, mats are formed by a wet-laid process, also referred to as a papermaking process, so that in forming the mats, the mat compositions, which generally contain a large amount of water, must be formulated to drain well and quickly during the forming process. Mat compositions must also be formulated to provide a suitable mount density to provide adequate pressure to hold the monolith in position. Typically, mount densities range from about 0.9 grams per cubic centimeter (g/cc) to about 1.2 g/cc. The sheets and mats can also be provided on a carrier or release liner.

In a preferred embodiment for mounting mats, the micaceous binders and intumescent materials comprise, on a dry weight basis, from about 20% to 30% micaceous binder, 60% to 70% intumescent material, 0.3% to 0.5% glass fibers having a diameter less than about 2 micrometers, 2% to 10% organic fibers, preferably in a mixture of about 50% fibrillated fibers and about 50% staple fibers, 1% to 3% inorganic fibers having a diameter between about 8 and 15 micrometers, and 1% to 5% resinous organic binder.

The inorganic materials of the invention include micaceous minerals that have been delaminated and preferably, delaminated and further crushed or ground. Preferred micaceous minerals include vermiculite. Especially preferred micaceous minerals are processed vermiculites selected from ground expanded vermiculite and delaminated vermiculite. The vermiculite is typically delaminated by exfoliating. This can be done by heating the vermiculite to expand the particles, or by chemical treatment with hydrogen peroxide or aqueous solutions of salts followed by washing and soaking in water to swell the vermiculite particle structure. The expanded or swollen vermiculite is then mechanically sheared in water to produce an aqueous dispersion of vermiculite particles or platelets. Suitable micaceous materials are commercially available from W. R. Grace & Company, and include a delaminated vermiculite powder (VFPS™ vermiculite) and an aqueous dispersion of chemically exfoliated vermiculite (Microlite™ vermiculite dispersion). In a preferred embodiment, expanded vermiculite flakes, such as Zonolite™ #5 available from W.R Grace & Company, are ground with water in a mogul or sigma blade mixer to provide useful particles that improve the erosion resistance and resiliency of a mounting mat, while providing adequate drainage of the mat composition in a papermaking process to form the mats.

Without wishing to be bound by theory, it is believed that the platelets prepared in this manner provide a fiber-like resiliency to the compositions which allows the compositions to be formed by a wet-laid process. In wet-laid processes, it is important that the compositions with the binders drain quickly after they have been poured onto a screen on a paper-making machine. Additionally, mats for mounting materials are preferably thicker than about 1 mm, and it is generally difficult to adequately drain thicker materials.

Suitable intumescent materials include unexpanded vermiculite, vermiculite ore, hydrobiotite, water swellable synthetic tetrasilicic fluorine type mica described in U.S. Pat. No. 3,001,571 (Hatch), alkali metal silicate granules as described in U.S. Pat. No. 4,521,333 (Graham et al.), and expandable graphite. Suitable intumescent materials also include EXPANTROL™ 4BW granules available from Minnesota Mining & Manufacturing Co., St. Paul Minn.

The glass fibers useful in the practice of the invention are those having a diameter less than about 2.0 micrometers. Suitable glasses include borosilicate glasses such as calcium aluminoborosilicate, magnesium aluminoborosilicate, and alkali (e.g., sodium and potassium) borosilicate. Preferably, the fibers are made from alkali borosilicate glass The term "glass" as used herein refers to an amorphous (i.e., a material having a diffuse x-ray diffraction pattern without definite lines to indicate the presence of a crystalline phase) inorganic oxide material. Suitable glass fibers have a softening point near the temperature of use. This temperature is typically below about 900° C., preferably below about 850° C., and most preferably below about 800° C. The term "softening point" refers to the temperature at which a glass in the form of a fiber of uniform diameter elongates at a specific rate under its own weight.

Suitable glass fibers are commercially available under the Micro-Strand™ Micro-Fibers™ trademarks from Schuller Co. When used, the glass fibers having a diameter less than 2.0 micrometers are included in amounts from about 0.1% to about 5%, and preferably from about 0.2% to about 1.0% for mat materials. Larger amounts of the glass fibers can slow the drainage of the water during the wet-laid process.

It is particularly surprising that the addition of a small amount, i.e., less than about 1%, glass fibers less than about 1.5 micrometers in diameter, significantly improves the erosion resistance of the mounting materials. Without wishing to be bound by theory, it is believed that the glass fibers soften and act as binders to provide added strength to the mounting materials at the temperature of use, i.e., in the range of about 200° C. to about 900° C.

Resinous organic binders and organic fibers can be included to provide resiliency and flexibility to sheet or mat mounting materials prior to mounting. Suitable resinous organic binder materials include aqueous polymer emulsions, solvent-based polymers, and 100% solids polymers. Aqueous polymer emulsions are organic binders polymers and elastomers in the latex form (e.g., natural rubber latices, styrene-butadiene latices, butadiene-acrylonitrile latices, and latices of acrylate and methacrylate polymers and copolymers). Solvent-based polymeric binders can include a polymer such as an acrylic, a polyurethane, or a rubber-based organic polymer. The 100% solids polymers include natural rubber, styrene-butadiene rubber, and other elastomers.

Preferably, the organic binder material includes an aqueous acrylic emulsion. Acrylic emulsions are preferred because of their aging properties and noncorrosive combustion products. Useful acrylic emulsions include those commercially available under the trade designations "RHOPLEX TR-934" (a 44.5% by weight solids aqueous acrylic emulsion) and "RHOPLEX HA-8" (a 44.5% by weight solids aqueous emulsion of acrylic copolymers) from Rohm and Haas of Philadelphia, Pa., and Airflex™ 600BP (a 55% solids ethylene vinyl acetate copolymer) from Air Products of Allentown, Pa.

Organic binder materials can also include at least one plasticizer. Plasticizers tend to soften a polymer matrix and thereby contribute to the flexibility and moldability of the sheet materials made from the composition.

When used, the organic binder is preferably used in amounts of about 1% to about 5%. For mat materials, the organic binder is preferably used in amounts between about 1% to about 4%.

Suitable fibers that are commercially available for use as reinforcement fibers or as chopped fibers dispersed within the mounting materials include inorganic fibers having a diameter greater than 5 micrometers, (available, for example, under the trade designations "NEXTEL 312 CERAMIC FIBERS," "NEXTEL 440 CERAMIC FIBERS," and "NEXTEL 550 CERAMIC FIBERS" from Minnesota Mining & Manufacturing Company, and Inconel fibers (commercially available, for example, under the trade designation "BEKI-SHIELD GR90/C2/2" from Bekaert Steel Wire Corp. of Atlanta, Ga.). Suitable ceramic fibers are also disclosed in U.S. Pat. Nos. 3,795,524 (Sowman) and 4,047,965 (Karst et al.).

Larger diameter glass fibers can also be included in the mounting materials. Preferably, the fibers are made from high temperature glass in diameters of greater than about 5 micrometers, and more preferably between about 8 and 16 micrometers. An example of a suitable commercially available glass fiber is S-2 Glass™HT from Owens-Corning Fiberglass Corp. which is a 9 micrometer glass fiber. When used, larger diameter glass fibers are used in amounts up to about 3% by weight. Larger amounts can be difficult to disperse in mat compositions which would lead to inconsistency in the mats that are formed.

Organic or polymeric fibers can be staple fibers or fibrillated fibers that are used to provide wet strength during processing and dry strength and resiliency to mat and sheet mounting materials prior to canning. In use, the fibers burned out within the first few heating cycles of the catalytic converter. Useful staple fibers range from about 0.5 to 5 denier and can be formed from materials including acrylics, cellulose, polyolefin, polyvinyl alcohol and polyester. Suitable rayon fibers having a size of 1.5 denier per filament (dpf) are commercially available from such sources as Minifiber, Inc. of Johnson City, Tenn. Suitable polyvinylalcohol fibers are available from Kuraray Company, Ltd., under the Kuralon™ tradename such as VPB 105—2×3 mm. When used, staple fibers are useful in a range between 1% to 5%, and preferably between about 1.5% to about 2.5% for mats.

Also useful are fibrillated fibers such as those described in one or more of U.S. Pat. Nos. 4,565,727, 4,495,030, 4,904,343, 4,866,107, and 4,929,502. A preferred fiber is a highly fibrillated acrylic fiber pulp commercially available from Cytek Industries, Inc., West Paterson, N.J., under the CFF™ tradename. The fibrillated acrylic fibers have a treelike structure with a trunk in the range of about 10 micrometers, and fibrils in sizes varying from a macro fibril down to fibrils of a few micrometers. The fiber length should be short enough so as to not interfere with the mixing or forming process. Suitable fiber lengths include less than about 8 mm in length, and are typically in the range of about 6.5 mm. Preferably, the fibers are readily dispersible in aqueous systems. The treelike morphology of the fibrillated fibers provides a mechanical interlocking of the fibers to each other as well as a very high surface area. Both of these properties can be used to effectively as a binder to trap and hold the particulate materials of the mat composition, and improve the drainage rates during the wet-laid forming process for mats. When used, the fibrillated fibers are included in amounts of less than about 5% by weight, and preferably less than about 3%, and more preferably less than about 2%. The preferred amounts of fibrillated fibers provide compositions that mix well and drain well. The resulting mounting materials also exhibit good tensile strength and resiliency for handling prior to canning while minimizing the amount of organic material in the composition that would burn off in the catalytic converter.

Mat compositions are slurries which have large amounts of water, typically over 95%, and can be formed into sheets by traditional wet-laid non-woven papermaking techniques. Briefly, this process includes mixing the components and pouring the slurry onto a wire mesh or screen to remove most of the water. The formed sheet is then blotted and dried to form a resilient mat.

In another aspect, the invention provides for a catalytic converter or a diesel particulate filter using the mounting material of the invention. A catalytic converter or diesel particulate filter generally comprises a housing, a monolithic structure or element(s), and a mounting material disposed between the structure and the housing to hold the structure in place.

The housing, which is also referred to as a can or a casing, can be made from suitable materials known in the art for such use and is typically made of metal. Preferably, the housing is made of stainless steel.

Suitable catalytic converter elements, also referred to a monoliths, are known in the art and include those made of metal or ceramic. The monoliths or elements are used to support the catalyst materials for the converter. A useful catalytic converter element is disclosed, for example, in U.S. Pat. No. RE 27,747 (Johnson).

Further, ceramic catalytic converter elements are commercially available, for example, from Corning Inc. of Corning, N.Y., and NGK Insulator Ltd. of Nagoya, Japan. For example, a honeycomb ceramic catalyst support is marketed under the trade designation "CELCOR" by Corning Inc. and "HONEYCERAM" by NGK Insulator Ltd. Metal catalytic converter elements are commercially available from Behr GmbH and Co. of Germany.

For additional details regarding catalytic monoliths see, for example, "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

The catalyst materials coated onto the catalytic converter elements include those known in the art (e.g., metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381 (Keith et al.).

FIG. 1 shows a catalytic converter 10 similar to that disclosed in U.S. Pat. No. 4,865,818 to Merry et al. but incorporating a preferred embodiment of the present invention. The catalytic converter 10 contains a catalyst which is typically coated onto a monolithic structure 20 mounted in the converter 10. The monolithic structure 20 is typically ceramic, although metal monoliths have been used. The catalyst oxidizes carbon monoxide and hydrocarbons, and reduces the oxides of nitrogen in automobile exhaust gas to control atmospheric pollution.

The catalytic converter 10 includes a metal housing 11 which holds within it the monolithic structure 20. The housing 11 has inlet and outlet ends 12 and 13, respectively.

The monolithic structure 20 generally has very thin walls to provide a large amount of surface area so it is fragile and susceptible to breakage. The monolithic structure 20 also has a coefficient of thermal expansion generally an order of magnitude less than the metal (usually stainless steel) housing 11 in which it is contained. In order to avoid damage to the monolith 20 from road shock and vibration, to compensate for the thermal expansion difference, and to prevent exhaust gasses from passing between the monolith 20 and the metal housing 11, an intumescent sheet material mat 30 according to the present invention is disposed between the monolithic structure 20 and the metal housing 11. The sheet material 30 may have a first end 31 and a second end 32.

Conventional monolithic type diesel particulate filter elements are typically wall flow filters comprised of honeycombed, porous, crystalline ceramic (e.g., cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Useful diesel particulate filter elements are commercially available, for example, from Corning Inc. of Corning, N.Y., and NGK Insulator Ltd. of Nagoya, Japan. Further, useful diesel particulate filter elements are discussed in "Cellular Ceramic Diesel Particulate Filter," Howitt et al., Paper No. 810114, SAE Technical Paper Series, 1981.

Figure 2:
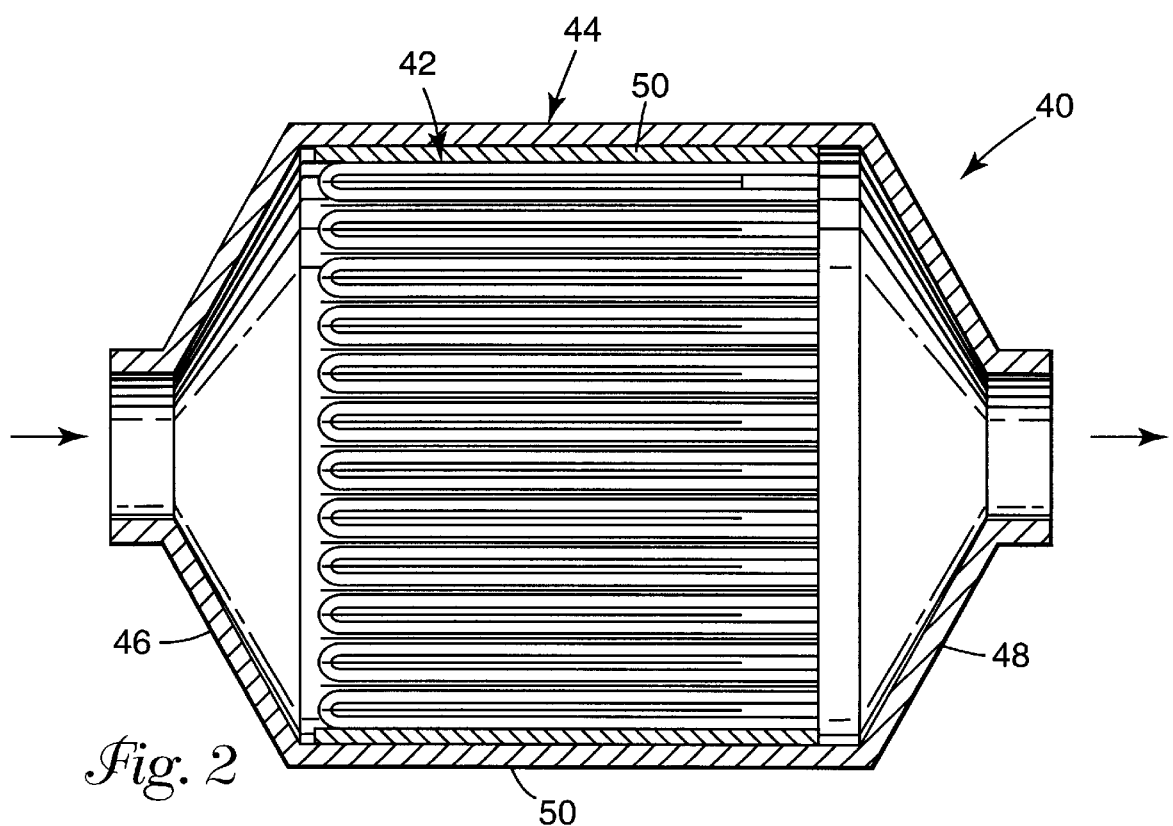
FIG. 2 is a longitudinal central section through a diesel particulate filter incorporating a preferred embodiment of the present invention.

FIG. 2 shows a diesel particulate filter 40 similar to that disclosed in U.S. Pat. No. 5,174,969 to Fischer et al. but incorporating a preferred embodiment of the present invention. The diesel particulate filter or trap 40 is a wall flow filter which has a honeycombed monolithic structure 42 comprising a bundle of tubes. A catalyst is typically coated onto the monolithic structure 42 mounted in the diesel particulate filter 40. The catalyst oxidizes carbon monoxide and hydrocarbons, and reduces the oxides of nitrogen in diesel engine exhaust gas to control atmospheric pollution.

The diesel particulate filter 40 includes a metal housing 44 which holds within it the monolithic structure 42. The housing 44 has inlet and outlet ends 46 and 48, respectively. The monolithic structure 42 generally has very thin walls to provide a large amount of surface area so it is fragile and susceptible to breakage. The monolithic structure 42 also has a coefficient of thermal expansion generally an order of magnitude less than the metal (usually stainless steel) housing 44 in which it is contained. In order to avoid damage to the monolith 42 from road shock and vibration, to compensate for the thermal expansion difference, and to prevent exhaust gasses from passing between the monolith 42 and the metal housing 44, an intumescent sheet material mat 50 according to the present invention is disposed between the monolithic structure 42 and the metal housing 44.

In use, the mounting materials of the invention are disposed between the monolith and the housing in similar fashion for either a catalytic converter or for a diesel particulate filter. This can be done by wrapping the monolith with a sheet of the mounting material and inserting the wrapped monolith into the housing, pumping the mounting material into a housing containing the monolith, coating the mounting material around the monolith, or molding the mounting material around the monolith and inserting the composite into the housing.

Objects and advantages of this invention are further illustrated by the following examples, but the particular materials and amounts thereof recited in these examples, as well as other conditions and details, should not be construed to unduly limit this invention. All parts and percentages are by weight unless stated otherwise.

TEST METHODS

Cold Erosion Test

This test is an accelerated test conducted under conditions that are more severe than actual conditions in a catalytic converter to provide comparative data as to the erosion resistance of a mat mounting material.

A test sample is cut into a square measuring 2.54 cm by 2.54 cm, weighed, and mounted between two high temperature Inconel 601 steel plates using spacers to obtain a mount density of 0.700 +/−0.005 $g/cm^3$. The test assembly is then heated for two hours at 800° C. and cooled to room temperature. The cooled test assembly is then positioned 3.8 mm in front of an air jet oscillating back and forth over the edge of the mat at 20 cycles per minute. The test is discontinued after 0.2 grams of material is lost or after 24 hours, whichever occurs first. The air jet impinges on the mat at a velocity of 305 meters per second. The erosion rate is determined by the weight loss divided by the time of the test and is reported in grams/hour (g/hr).

Real Condition Fixture Test (RCFT)

The RCFT is a test used to measure the pressure exerted by the mounting material under conditions representative of actual conditions found in a catalytic converter during normal use.

Two 50.8 mm by 50.8 mm heated platens controlled independently are heated to different temperatures to simulate the metal housing and monolith temperatures, respectively. Simultaneously, the space or gap between the platens is increased by a value calculated from the temperature and thermal expansion coefficients of a typical catalytic converter. The temperatures of the platens and the gap change are presented in Table 1 below. The force exerted by the mounting material is measured by a Sintech ID computer controlled load frame with Extensometer (MTS Systems Corp., Research Triangle Park, N.C.).

TABLE 1

| Top Platen Temperature (°C.) | Bottom Platen Temperature (°C.) | Gap Change (mm) |
| --- | --- | --- |
| 25 | 25 | 0 |
| 50 | 25 | 0 |
| 100 | 30 | 0 |
| 150 | 33 | 0 |
| 200 | 35 | 0 |
| 250 | 38 | 0 |
| 300 | 40 | 0 |
| 350 | 45 | 0 |
| 400 | 50 | 0 |
| 450 | 60 | 0 |
| 500 | 70 | 0 |
| 550 | 85 | 0.0127 |
| 600 | 100 | 0.0254 |
| 650 | 125 | 0.0381 |
| 700 | 150 | 0.0508 |
| 750 | 185 | 0.0762 |
| 800 | 220 | 0.1016 |
| 850 | 325 | 0.1651 |
| 900 | 430 | 0.2286 |
| 900 | 480 | 0.2667 |
| 900 | 530 | 0.3048 |
| 850 | 502 | 0.2921 |
| 800 | 474 | 0.2794 |
| 750 | 445 | 0.2540 |
| 700 | 416 | 0.2286 |
| 650 | 387 | 0.2159 |
| 600 | 358 | 0.2032 |
| 550 | 329 | 0.1905 |
| 500 | 300 | 0.1778 |
| 450 | 275 | 0.1651 |
| 400 | 250 | 0.1524 |
| 350 | 210 | 0.1270 |
| 300 | 180 | 0.1016 |
| 250 | 155 | 0.0889 |
| 200 | 130 | 0.0762 |
| 150 | 95 | 0.0508 |
| 100 | 60 | 0.0254 |
| 50 | 43 | 0.0127 |
| 25 | 25 | 0 |

Hot Shake Test

The Hot Shake Test is used to evaluate a mounting material for a catalytic converter by subjecting a catalytic converter with the mounting to vibration and hot exhaust gas from a gasoline engine.

A catalytic converter, with the ceramic monolith mounted securely within it, is attached to a solid fixture atop a shaker table (Model TC 208 Electrodynamic Shaker Table from Unholtz-Dickie Corp., Wallingford, Conn.). The converter is then attached through a flexible coupling to the exhaust system of a Ford Motor Co. 7.5 liter displacement V-8 gasoline powered internal combustion engine. The converter is tested using an inlet exhaust gas temperature of 900° C. at an engine speed of 2200 rpm with a 30.4 kg-meter load using an Eaton 8121 Eddy-current dynamometer while shaking the converter at 100 Hz and 30 g acceleration from the shaker table. The converter is shaken for 100 hours and then taken apart and examined visually.

Flexibility Test

This test is a measure of the flexibility and resilience of a mounting material, and is an indication of whether or not the material can be used as a sheet or a mat.

The test is conducted by taking a 2.54 cm wide strip of the dried sheet or mat material and wrapping it 180 degrees around various diameters ranging from 9.5 mm to 203 mm. The smallest diameter was recorded when cracking occurred (1 mm to 2 mm gaps started to form in the mat material), and when breaking occurred (gaps greater than 10 mm formed, or complete separation of the mat occurred).

EXAMPLES

Example 1

A delaminated vermiculite composition was prepared by mixing 500 grams of expanded vermiculite (Zonolite #5 available from W.R. Grace & Co.) and about 1400 milliliters of water in a one gallon (3.8 liter) Baker Perkins Sigma Blade Mixer (Model 4 ANZ from Baker Perkins, now APV Chemical Machinery, Inc., Saginaw, Mich.) for 30 minutes. During mixing, the expanded vermiculite particles were delaminated and had a particle gradient ranging in size from very fine dusty particles to coarse platelets. The resulting material, having a solids content of 26.7%, is referred to hereafter as a ground expanded vermiculite (GEV).

An intumescent mat composition was prepared by adding 2500 ml of water, 1.4 grams of polyvinylalcohol (PVA) binder fiber (Kuralon™VPB 105—2×3 mm available from Kuraray Co., Ltd.), and 78.8 grams of GEV (26.7% solids) to a 3.8 liter waring blender, and blending at the low speed setting for 10 seconds. After blending, 0.36 gram of 0.65 micrometer diameter glass microfibers (MicroStrand™Micro-Fiber™ 106/465 available from Schuller) was added and blended for another 10 seconds. Then 2.8 grams of 1.5 dpf 6 mm rayon fibers (available from Minifiber, Inc.) were added and blended for 15 seconds, and 1.4 grams of 3 mm long 11 micrometer diameter ceramic fibers (NEXTEL™ 312 fibers available from Minnesota Mining & Manufacturing Co.) were added and blended for 20 seconds. The resulting slurry was then transferred to a 4 liter beaker using 500 ml of rinse water, and mixed with an air mixer having a propeller blade. During mixing, 43.2 grams of −18 mesh (less than 1 mm in size) vermiculite ore (available from Cometals, Inc., New York, N.Y.), 7 grams of alkali silicate granules (Expantrol™ granules available from Minnesota Mining & Manufacturing Co.), and 3 grams of a 1% solids solution of polyacrylamide flocculant (Nalco™7530 from Nalco Chemical Company, Chicago, Ill.) were added. The mixture was vigorously agitated and then quickly poured onto a 20 cm×20 cm 80 mesh screen sheet mold, (Williams Apparatus Co., Watertown, N.Y.). The valve on the mold was opened immediately to minimize settling of the particulates and the slurry was dewatered. The surface of the sheet was then blotted with paper and removed from the mold. The sheet was then sandwiched between additional blotter papers, pressed at 6 kiloPascals for 5 minutes, and dried on a sheet drier (Williams Apparatus Co.) for 45 minutes at 110° C. The resulting sheet had a thickness of 2.5 mm. The dried sheet was tested for cold erosion according to the above-described test method. Cold Erosion test results are shown in Table 2, as well as the composition by dry weight percent (Wt %).

Example 2

Example 2 was prepared and tested as in Example 1 except that 0.18 gram of glass microfibers was added and 65.5 grams of GEV (26.7% solids) were used. Test data is shown in Table 2.

Examples 3–6

Examples C1–C4 were prepared and tested as in Example 1 except that glass microfibers were omitted. The specific compositions and test results are shown in Table 2 and varying amounts of GEV and alkali silicate granules were used.

Comparative Example C1

This material was well accepted commercial product (INTERAM™ brand Type 100 Automotive Mounting Mat available from Minnesota Mining & Manufacturing Co., St. Paul Minn.)

TABLE 2

| Materials-Dry Wt % | Example | | | | | | |
|---|---|---|---|---|---|---|---|
| | 1 | 2 | 3 | 4 | 5 | 6 | C1 |
| PVA Binder Fiber | 1.8 | 2.0 | 1.8 | 2.0 | 2.0 | 2.2 | — |
| Rayon Fibers | 3.6 | 4.0 | 3.6 | 4.0 | 4.0 | 4.4 | — |
| Nextel ™ Fibers | 1.8 | 2.0 | 1.8 | 2.0 | 2.0 | 2.2 | — |
| Vermiculite Ore | 56.0 | 61.7 | 56.3 | 61.9 | 61.9 | 68.8 | — |
| GEV | 27.2 | 25.0 | 27.3 | 20.1 | 30.1 | 22.3 | — |
| Glass Microfibers | 0.5 | 0.3 | 0 | 0 | 0 | 0 | — |
| Expantrol ™ 4BW | 9.1 | 5.0 | 9.1 | 10.0 | 0 | 0 | — |
| Cold Erosion (g/hr) | 0.002 | 0.06 | 0.01 | 3 | 5 | 340 | 0.1 |

The data in Table 2 show that the amounts of GEV, Expantrol™ granules, and glass microfibers can be adjusted to improve erosion resistance. The preferred compositions of the invention exhibit superior resistance to accelerated erosion as compared with a commercially accepted product.

Examples 7–11

Mats for Examples 7–11 were prepared as in Example 1 using the materials in dry weight percent indicated in Table 3. Fibrillated acrylic fibers (CCF™ 114-3 Fibrillated Acrylic Fibers available from Cytec Industries Inc.) were added to Example 7; fibrillated fibers and glass fibers (S-2 Glass™HT available from Owens-Corning Fiberglass Corp. were added to Examples 8–10; and for Example 11 fibrillated fibers were added and a combination of two different types of delaminated vermiculite (VFPS™ Vermiculite Powder and Microlite™903 vermiculite dispersion, both available from W.R. Grace & Co.) was used in place of GEV.

TABLE 3

| Materials-Dry Wt % | Example | | | | |
|---|---|---|---|---|---|
| | 7 | 8 | 9 | 10 | 11 |
| Fibrillated Fibers | 2.1 | 2.0 | 2.1 | 2.0 | 2.0 |
| Rayon Fibers | 2.1 | 2.0 | 2.1 | 2.0 | 2.0 |
| Glass Microfibers | 0 | 0.3 | 0.3 | 0.3 | 0.3 |
| Glass Fibers | 2.1 | 2.0 | 2.1 | 2.0 | 2.0 |
| Vermiculite ore | 67.3 | 63.7 | 67.1 | 63.7 | 67.7 |
| Expantrol ™ 4BW | 0 | 5.0 | 0 | 5.0 | 5.0 |
| GEV | 26.4 | 25.0 | 26.3 | 25.0 | 0 |
| VFPS ™ Vermiculite | 0 | 0 | 0 | 0 | 20.0 |
| Microlite ™ 903 | 0 | 0 | 0 | 0 | 1.0 |
| Cold Erosion Rate (g/hr) | 0.15 | 0.03 | 0.01 | 0.03 | 0.04 |

The data in Table 3 illustrate the superior erosion resistance of preferred compositions of the invention.

Examples 12–16

Mats were prepared as in Example 1 using the materials shown in Table 4. All of the mat compositions included an organic binder (44.5% solids aqueous emulsion of acrylic copolymers ("RHOPLEX HA-8")) in the dry weight % solids shown in the table. Mats for Examples 13 and 14 included a partially dehydrated vermiculite (PVD) instead of vermiculite ore. The partially dehydrated vermiculite was prepared as described in Example 11 of U.S. Pat. No. 5,254,410 (Langer et al.), incorporated herein by reference. The mats were tested for erosion rate as well as for performance on the Real Condition Fixture Test (RCFT). Test results are shown in Table 4.

TABLE 4

| Materials-Dry Wt % | Example | | | | | |
|---|---|---|---|---|---|---|
| | 12 | 13 | 14 | 15 | 16 | C1 |
| Rayon Fibers | 4.5 | 4.5 | 5.5 | 4.5 | 2.0 | — |
| Glass Microfibers | 1.0 | 1.0 | 1.0 | 1.0 | 0.3 | — |
| Glass Fibers | 2.5 | 2.5 | 2.5 | 2.5 | 2.0 | — |
| Vermiculite ore | 61.0 | 0 | 0 | 68.2 | 64.5 | — |
| Expantrol ™ 4BW | 0 | 0 | 5.0 | 0 | 0 | — |
| GEV | 28.5 | 28.5 | 27.0 | 21.4 | 26.5 | — |
| PVD | 0 | 61.0 | 56.0 | 0 | 0 | — |
| Organic Binder | 2.5 | 2.5 | 3.0 | 2.5 | 3.0 | — |
| Cold Erosion Rate (g/hr) | 0.07 | 0.05 | 0.01 | 0.04 | — | 0.01 |
| RCFT Peak Pressure KPa) | 1140 | 950 | 690 | 1510 | — | 1000 |
| RCFT 3rd Cycle pressure (KPa) | 70 | 140 | 140 | 140 | — | 70 |

The data in Table 4 show that good erosion results and the RCFT test results show that the mounting materials maintain adequate holding force.

Example 17

A mat mounting material was formed on a Fourdrinier paper machine using the composition of Example 9. The mat was about 1.6 mm thick and had a basis weight of 950 grams per square meter. Two rectangular mats were cut from the mat mounting material to completely wrap the lateral surfaces of two oval ceramic monoliths measuring 146 mm by 89 mm by 89 mm long (obtained from Maremont Corp., Louden, Tenn.) were wrapped with the mats. The two wrapped monoliths were placed in a dual cavity catalytic converter can (also obtained from Maremont Corp.). The mount density was 1.1 grams per square centimeter. The converter was then test according to the hot shake test. After 100 hours, the converter can was disassembled and the mounting material was found to be in good shape, as evidenced by no cracking of the monolith and no erosion of the mat. There was also no relative movement of the monolith inside of the can, indicating that the mounting material securely held the monolith in place under the severe test conditions.

Examples 18–23

Mats were formed using compositions shown in Table 5 and using different mixers to mix the materials. Examples 18–20 were mixed as described in Example 1. The GEV in Examples 21–23 was mixed on a Ross mixer which included both a planetary blade and a high shear dispersing blade (Model PD 4 Mixer available from Charles Ross & Son Co., Hauppauge. N.Y.). The sheets were tested for drainage time, tensile strength, and elongation. The drainage time was determined from the time that the valve on the sheet former was opened until water was no longer visible on the surface of the formed mat. The tensile strength and elongation were determined on a Thwing Albert Tensile Tester with a jaw separation of 12.7 cm and a jaw separation speed of 2.54 cm/min.

Comparative Examples C2 and C3

Mats were formed for Examples C2 and C3 using the compositions described in Examples 1 and 3 of GB 1,522, 646 (Wood), except that the compositions were formed on a handsheet former rather than dewatered with a filter paper. The examples were tested for drainage, flexibility, tensile, and elongation as in Examples 18–23. Test results are shown in Table 5.

TABLE 5

| Materials-Dry Wt % | Example |  |  |  |  |  |  |  |
|---|---|---|---|---|---|---|---|---|
|  | 18 | 19 | 20 | 21 | 22 | 23 | C2 | C3 |
| Rayon Fibers | 2.0 | 2.0 | 2.0 | 2.0 | 2.0 | 2.0 | — | — |
| Glass Microfibers | 0.3 | 0.3 | 0.3 | 0.3 | 0.3 | 0.3 | — | — |
| Glass Fibers | 2.0 | 2.0 | 2.0 | 2.0 | 2.0 | 2.0 | — | — |
| Vermiculite ore | 67.3 | 67.3 | 65.9 | 65.9 | 65.9 | 65.9 | 60 | 60 |
| Fibrillated Fibers | 0 | 2.0 | 2.0 | 2.0 | 2.0 | 2.0 | — | — |
| GEV | 26.3 | 26.3 | 25.8 | 25.8 | 25.8 | 25.8* | — | — |
| Organic Binder** | 2.0 | 0 | 2.0 | 2.0 | 2.0 | 2.0 | — | — |
| #5 Expanded Vermiculite | — | — | — | — | — | — | 20.0 | 26.7 |
| Code 106 Fiberglass | — | — | — | — | — | — | 1.7 | 2.3 |
| Ceramic Fibers | — | — | — | — | — | — | 5.0 | 11.5 |
| Bentonite | — | — | — | — | — | — | 13.3 | — |
| Drainage Time (sec) | 10 | 10 | 20 | 20 | 75 | 37 | 500 | 17 |
| Cold Erosion Rate (g/hr) | 1.2 | — | 5.9 | 7.2 | 1.0 | 2.1 | — | — |
| Tensile (KPa) | 226 | 230 | 284 | 296 | 405 | 371 | 168 | 98 |
| Elongation (%) | 2.3 | — | 1.3 | 2.2 | 1.8 | 2.1 | 0.5 | 0.7 |
| Flexibility-diameter at crack-cm | 2.54 | 1.54 | 1.54 | 2.54 | 2.54 | 2.54 | 20.32 | 20.32 |
| Flexibility-diameter at break-cm | 0.95 | 0.95 | 0.95 | 0.95 | 0.95 | 0.95 | 12.7 | 12.7 |

*Used VFPS ™ Vermiculite Powder
**Used acrylic emulsion (Airflex ™ 600BP DEV), available from Air Products and Chemicals, Inc., Allentown, PA, an acrylate-vinyl acetate-ethylene terpolymer.

The data in Table 5 show that compositions of the invention have excellent drainage properties as compared to prior art paste compositions, while having improved tensile strength and elongation, and significantly better flexibility.

It will be apparent to those skilled in the art that various modifications and variations can be made in the method and article of the present invention without departing from the spirit or scope of the invention. Thus, it is intended that the present invention cover the modifications and variations of this invention provided they come within the scope of the appended claims and their equivalents.

What is claimed is:

1. A pollution control device comprising:
   (a) a housing:
   (b) a pollution control element disposed within said housing; and
   (c) a flexible intumescent sheet material comprising 20 to 80 dry weight percent of at least one unexpanded intumescent material, 10 to 40 dry weight percent of vermiculite platelets selected from at least one of expanded vermiculite ground into platelets and expanded vermiculite delaminated into platelets, greater than 0 to 5 dry weight percent of inorganic fibers having diameters greater than 5 microns, and greater than 0 to 10 dry weight percent of organic fibers; wherein said sheet material comprises substantially no ceramic fibers having a diameter of less than 5 microns, said sheet material being disposed between said pollution control element and said housing.

2. The pollution control device of claim 1, wherein said sheet material further comprises from greater than 0 to about 5 dry weight percent of glass fibers having a diameter of less than about 2 microns.

3. The pollution control device of claim 1, wherein said sheet material comprises from greater than 0 to 5 dry weight percent of inorganic fibers having diameters greater than 5 microns.

4. The pollution control device of claim 1, wherein said sheet material further comprises from greater than 0 to 5 weight percent of an organic binder.

5. The pollution control device of claim 1, wherein said vermiculite platelets are selected from expanded vermiculite ground into platelets.

6. The pollution control device of claim 1, wherein the organic fibers of said sheet material comprise fibrillated fibers in an amount less than about 5 percent by weight.

7. The pollution control device of claim 1, wherein said inorganic fibers having diameters greater than 5 microns are high temperature glass fibers.

8. The pollution control device of claim 1, wherein said sheet material comprises from about 2 to about 5 dry weight percent of said organic fibers.

9. The pollution control device of claim 1, wherein the unexpanded intumescent material is unexpanded vermiculite, the vermiculite platelets are selected from expanded vermiculite ground into platelets, and the weight ratio of said expanded vermiculite to unexpanded vermiculite is 1:2.5.

10. The pollution control device of claim 1, wherein the dry weight percent of the combination of the unexpanded intumescent material and the processed vermiculite together is about 88 to 93 dry weight percent.

11. The pollution control device of claim 1, wherein said sheet material comprises from about 60 to 70 dry weight percent of at least one unexpanded intumescent material, 20 to 30 dry weight percent of at least one processed expanded vermiculite selected from expanded vermiculite ground into platelets and expanded vermiculite delaminated into platelets, 1 to 3 dry weight percent of inorganic fibers having diameters between about 8 and 15 microns, and 2 to 10 dry weight percent of organic fibers.

12. The pollution control device of claim 1, wherein the pollution control element and the housing define a space therebetween and said intumescent sheet material fills substantially all of the space.

13. The pollution control device of claim 1, wherein said sheet material is a wet laid sheet material.

14. The pollution control device of claim 1, wherein said vermiculite platelets are selected from expanded vermiculite delaminated into platelets.

15. The pollution control device of claim 1, wherein the organic fibers of said sheet material comprise fibrillated fibers in an amount less than about 3 percent by weight.

16. The pollution control device of claim 1, wherein the organic fibers of said sheet material comprise fibrillated fibers in an amount of less than about 2% by weight.

17. A process of forming a flexible intumescent mat comprising the steps of:

forming expanded vermiculite;

processing the expanded vermiculite into platelets;

forming a slurry by mixing, in aqueous solution, components comprising:

20 to 80 dry weight percent of at least one unexpanded intumescent material;

10 to 40 dry weight percent of the platelets;

greater than 0 to 5 dry weight percent of inorganic fibers having diameters greater than 5 microns; and greater than 0 to 10 dry weight percent of organic fibers; the components having substantially no ceramic fibers having a diameter of less than 5 microns; and drying the slurry to form a flexible mat.

18. The process of forming a flexible intumescent mat of claim 17, wherein the step of processing expanded vermiculite into platelets comprises:

mechanically shearing the expanded vermiculite in water to produce an aqueous dispersion of vermiculite platelets.

19. The process of forming a flexible intumescent mat of claim 17, wherein said step of drying the slurry includes forming the slurry into a sheet material made by a wet laid process, and then forming the flexible mat from the sheet material.

20. A flexible intumescent sheet material consisting essentially of 20 to 80 dry weight percent of at least one unexpanded intumescent material, 10 to 40 dry weight percent of vermiculite platelets selected from at least one of expanded vermiculite ground into platelets and expanded vermiculite delaminated into platelets, greater than 0 to 10 dry weight percent of inorganic fibers having diameters greater than 5 microns, greater than 0 to 10 dry weight percent of organic fibers and greater than 0 to less than 1 dry weight percent of glass fibers having a diameter of less than about 2 microns, and substantially no ceramic fibers having a diameter of less than 5 microns.

* * * * *

UNITED STATES PATENT AND TRADEMARK OFFICE
CERTIFICATE OF CORRECTION

PATENT NO.    : 5,869,010
DATED         : February 9, 1999
INVENTOR(S)   : Roger L. Langer It is certified that error appears in the above-identified patent and that said Letters Patent is hereby corrected as shown below:

Column 4,
Line 55, insert -- . -- following "borositicate glass"

Column 6,
Line 37, delete first instance of "to"

Column 7,
Line 1, "a" should read -- as --

Column 16,
Line 21, "10" should read -- 5 --

Signed and Sealed this

Fifteenth Day of January, 2002

JAMES E. ROGAN
Director of the United States Patent and Trademark Office